Nov. 23, 1965 J. D. DANNER 3,218,744
PROJECTOR AND TRANSPARENT SLIDE STORAGE MAGAZINE THEREFOR
Filed Nov. 6, 1961 6 Sheets-Sheet 1

INVENTOR.
JACOB D. DANNER
BY David M. Keay
AGENT.

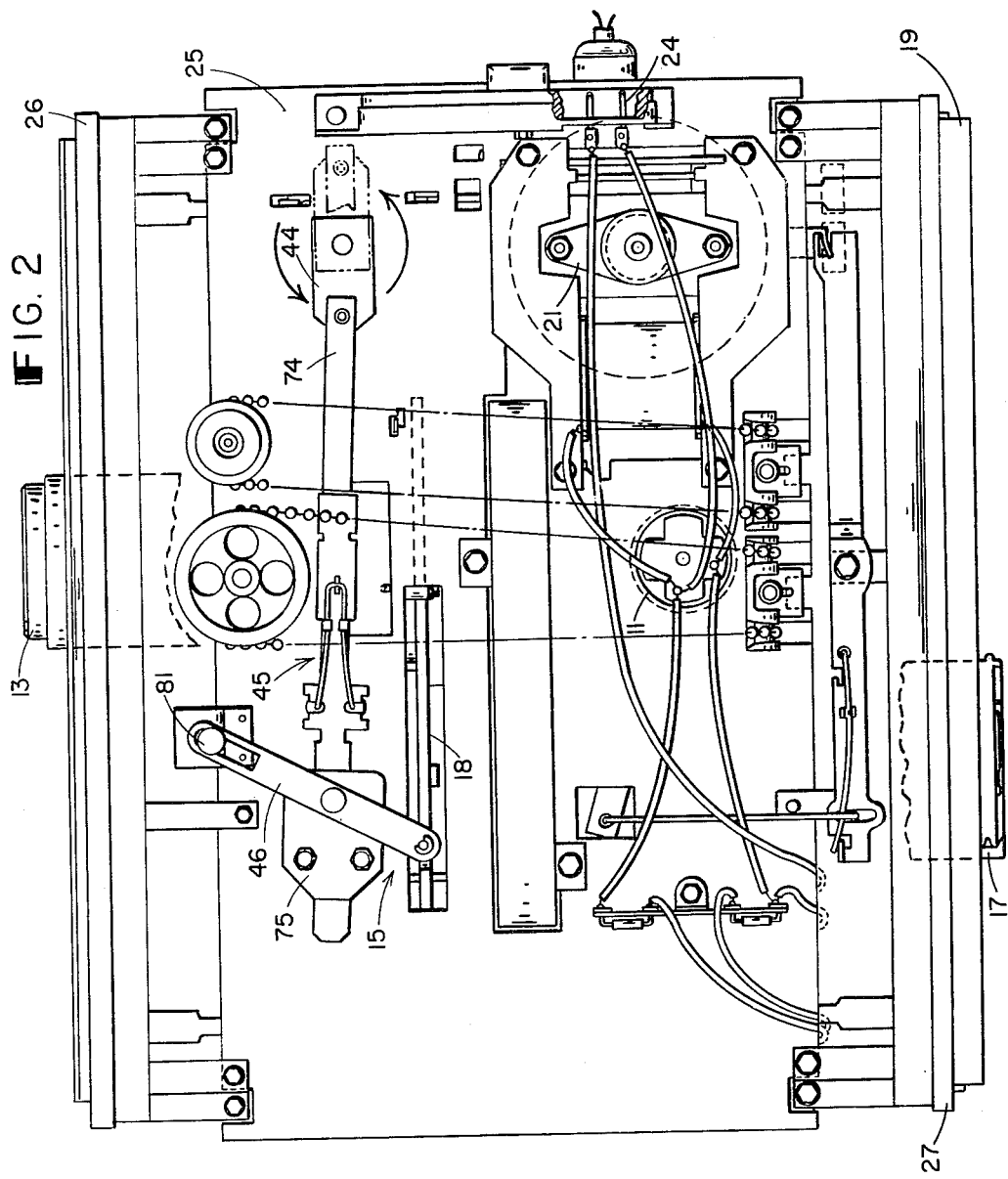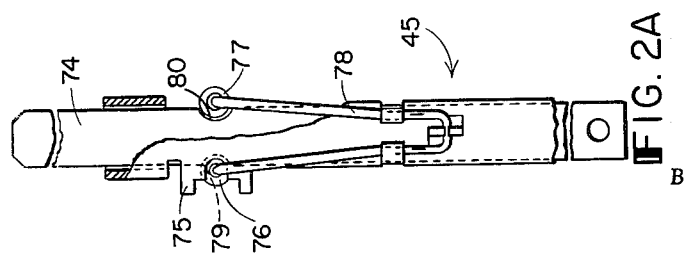

INVENTOR.
JACOB D. DANNER
BY David M. Keay
AGENT.

Nov. 23, 1965   J. D. DANNER   3,218,744
PROJECTOR AND TRANSPARENT SLIDE STORAGE MAGAZINE THEREFOR
Filed Nov. 6, 1961   6 Sheets-Sheet 6

INVENTOR.
JACOB D. DANNER
BY
David M. Keay
AGENT.

United States Patent Office 3,218,744
Patented Nov. 23, 1965

3,218,744
PROJECTOR AND TRANSPARENT SLIDE
STORAGE MAGAZINE THEREFOR
Jacob D. Danner, Whitmore Lake, Mich., assignor, by mesne assignments, to Argus Incorporated, a corporation of Delaware
Filed Nov. 6, 1961, Ser. No. 150,482
17 Claims. (Cl. 40—79)

The present invention relates to optical projectors for projecting the image of a transparent slide onto a viewing surface. More particularly, it is connected with optical slide projectors which are adapted to receive a magazine containing a supply of slides in a predetermined arrangement and to place the slides in projecting position in sequence. The invention is also concerned with slide storage magazines which hold a supply of slides to be shown by a projector.

Optical slide projectors which employ a removable slide storage magazine or tray containing a supply of slides to be shown are well known. A magazine is placed in the slide changer of the projector in slide showing position. The changer is operated either manually, semi-automatically, or automatically in order to move a slide from the magazine to the projection gate of the projector for viewing. The slide is subsequently returned to its place in the magazine and the magazine is advanced by a magazine transport mechanism so as to place the next slide in sequence in position for movement into the gate. The magazine not only serves as a container for holding slides in a prearranged order at the projector, but also serves as a convenient receptacle for storing the slides while the magazine is detached from the projector.

Slide storage magazines are generally rectangular boxes divided by transverse partitions into a longitudinal series of compartments. A transparent slide fits into each of the compartments. One side of the magazine is open or partially open to permit the slides to be transferred transversely into and out of the magazine. Many types of magazines have an opening into each compartment at the side opposite the open side in order to permit the entrance of a slide injecting member which pushes the slide out of the compartment located at the slide transfer station opposite the gate and into the projection gate. Certain types require individual frames or holders for each slide which are engaged by a member of the slide changer for transferring the slides. Slide magazines commonly have a longitudinally arranged rack gear which is engaged by the magazine transport mechanism of the slide changer in order to advance the magazine and place the next compartment at the slide transfer station after a slide has been shown and returned to its compartment.

Many slide storage magazines have a slide retaining arrangement in order to prevent the inadvertent dropping or removal of slides from the magazine. The retaining members may be individual spring clips at each slide compartment, or they may be more elaborate covers or partial covers for blocking the open side of the magazine when the magazine is removed from the projector. Retaining members are generally extra parts which are added to the basic magazine thereby increasing its complexity and cost of manufacture. Many types of slide retraining arrangements require suitable mating arrangements on the projector in order to unblock the open side of the magazine so as to permit the passage of slides to the gate. These unblocking arrangements may be complicated in themselves. Retaining members which are spring loaded may require that the slide injecting member exert considerable force against the slide in order to overcome the strength of the retaining member and move the slide. If the slides are not mounted in individual protective frames, they may be exposed to forces which could cause excessive wear.

In order for the slide injecting member to contact the slides properly, alignment must be obtained between each magazine compartment and the projector, or more specifically, between each slide and the slide injecting member. With projectors and magazines which are adapted to make use of the common type of cardboard mounted slides without individual frames, misalignment between the slide injecting member and the slides may damage the slides. Since the cardboard mounted slides are fairly thin, the injecting member may pass between a partition and the slide either scratching the slide or otherwise damaging it and jamming the projector.

It is an object of the present invention, therefore, to provide an improved slide storage magazine for containing a supply of slides to be shown by an optical slide projector.

It is also an object of the invention to provide an improved optical slide projector for showing slides from a supply of slides contained in a slide storage magazine.

It is another object of the invention to provide a slide storage magazine which has an improved arrangement for retaining slides in the magazine and which becomes aligned with the slide injecting member of the projector so as to prevent jamming.

It is a still further object of the invention to provide an optical slide projector having an improved arrangement for overcoming the slide retaining arrangement of the slide magazine and having a slide injecting member which aligns the slide in the magazine with the slide injecting member so as to prevent jamming.

Briefly, a slide storage magazine according to the invention comprises two body members which are pivotally connected together to provide a generally rectangular elongated structure having a first solid wall, a second solid wall opposite the first wall, a first side wall having an opening along its length, and an open side opposite the first side wall. The interior of the magazine is divided into a plurality of slide storage compartments by transverse partitions or fins which extend a short distance toward each other from the first and second solid walls so as to provide support and separation for the slides adjacent their peripheries. Protrusions of the partitions from one of the walls extend into a portion of the opening along the length of the side wall. The two body members are biased about the pivot connections in a direction tending to close the opening of the open side in order to prevent slides from passing through the open side.

A projector according to the invention includes a support adapted to receive a slide magazine and position it in slide showing position. The projector also includes a slide transfer means for moving a slide from the magazine into projecting position in the projection gate and for returning the slide from the gate to the magazine. Magazine opening means on the projector engage the body members of the magazine when the magazine is in slide showing position so as to overcome the bias on the body members and pivot the members apart. This action increases the opening of the open side sufficiently to permit slides to be moved freely from the magazine to the projection gate and back by the slide transfer means. A slide is pushed from the magazine to the gate through the enlarged opening of the open side of the magazine by a slide transfer member of the slide transfer means which passes through the opening in the first side of the magazine and into the magazine. A first section of the slide transfer member fits between the protrusions of two adjacent partitions defining a slide compartment thereby guiding the transfer member into the compartment. A second section of the slide transfer member is wider than the depth or space between the opposed surfaces of adjacent partitions defining a single slide compartment and passes through a portion of the opening in the one side removed from the portion having protrusions of the partitions extending therein.

It is a feature of the invention to provide a longitudinal ridge along the inside of each of the two solid walls adjacent the open side of each compartment of the magazine. The ridges from each wall extend toward each other and assist in preventing the slides from inadvertently dropping from the magazine while the magazine is not in slide showing position in a slide projector.

It is also a feature of the invention to provide magazine opening cams for enlarging the opening of the open side of the magazine as the magazine is inserted into slide showing position in the projector. The cams are mounted on a side wall of the magazine support of the projector intermediate the magazine and the projection gate. The cams have upper and lower surfaces which diverge as they approach the opening in the side wall through which slides are transferred from the magazine to the projection gate. The partitions and the top and bottom walls of the magazine adjacent the open side extend beyond the major portion of the end walls and the edges of the partitions engage the cam surfaces so that the two body members are pivoted apart as the magazine is inserted into slide showing position. The surfaces of the cams acting on the body members of the magazine separate the body members sufficiently to permit slides to pass freely through the opening of the open side of the magazine.

It is another feature of the invention to provide an injector arm for contacting the slide located in the magazine compartment at the slide transfer station opposite the opening in the side wall, and for pushing the slide through the open side of the magazine and the opening in the side wall and into the projection gate. The injector arm has a lower section which fits between the protrusions of two adjacent partitions of the lower body member so as to positively align the arm with the magazine compartment. The upper section of the injector arm is slightly wider than the depth of one slide compartment so that the leading end of the arm, by spanning the depth of the compartment, cannot by-pass the edge of the slide to cause jamming. However, the width of the upper section of the arm is less than the depth of the compartment plus the thickness of two partitions so that the arm does not extend into adjacent compartments. The end of the injector arm comes into contact with the edge of the slide and pushes it out of the magazine, through the opening of the open side, and into the projection gate.

Additional objects, features, and advantages of slide storage magazines and slide projectors according to the invention will be apparent from the following detailed discussion and the accompanying drawings wherein:

FIG. 2 is a bottom view of the projector with the bottom and side covers removed to show the chassis or main support plate of the projector;

FIG. 2A is a detailed fragmentary view of a collapsible connecting link in the driving mechanism between the drive motor and the slide transfer carriage of the slide changing mechanism;

FIG. 10 is a perspective view of a slide storage magazine according to the invention;

FIG. 11 is an end view of the slide storage magazine of FIG. 10;

FIG. 12 is a fragmentary view of the slide magazine from below illustrating the manner in which the slide magazine is engaged by a drive wheel of the magazine transport mechanism;

FIG. 13 is a fragmentary view from below illustrating the manner in which the injector arm of the slide transfer carriage coacts with the slide magazine and engages a slide located in a compartment of the magazine; and FIG. 14 is a fragmentary view from the side illustrating the manner in which the injector arm of the slide transfer carriage engages the slide magazine.

*General description*

Figure 1:
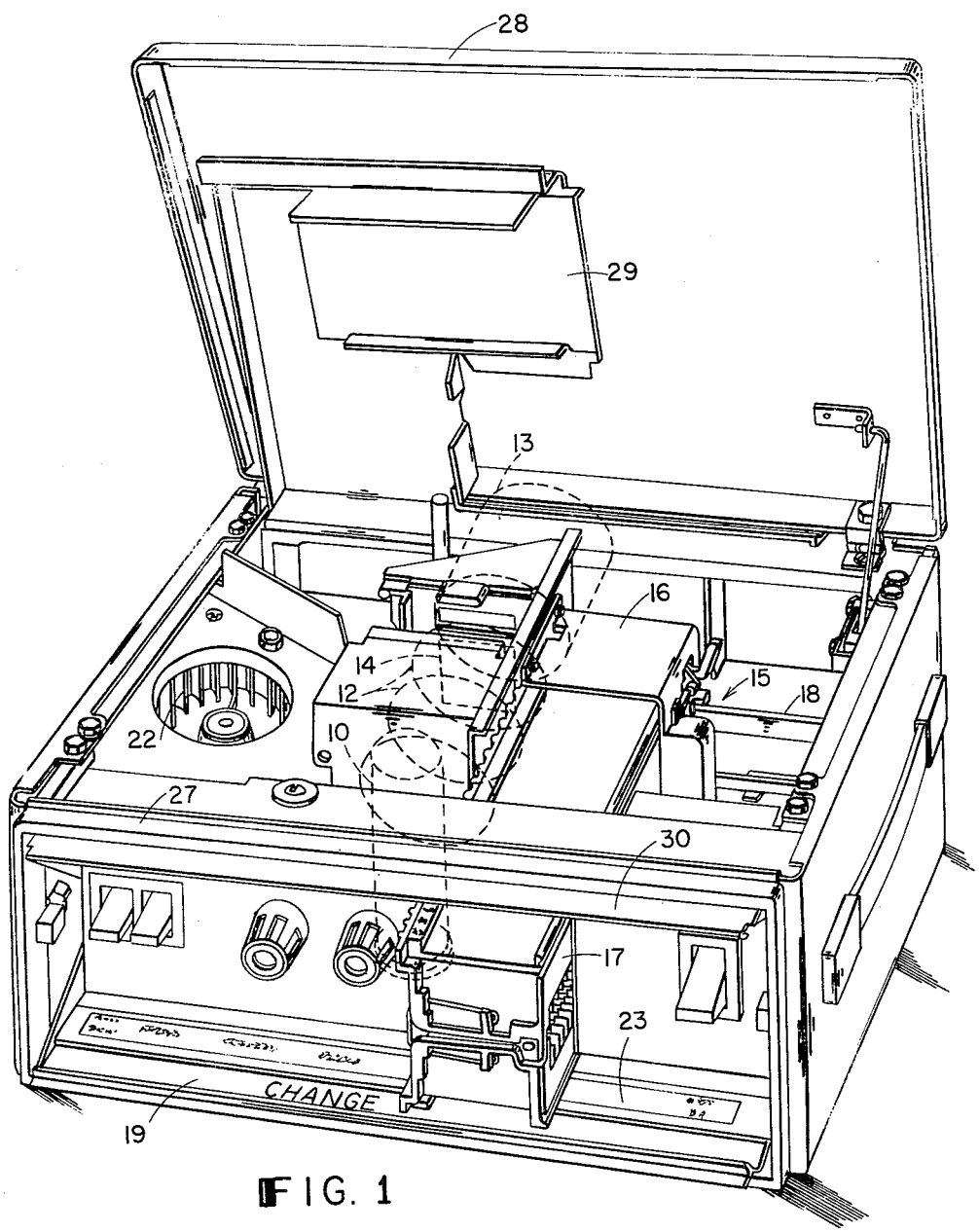
FIG. 1 is a perspective view from the rear, or operator's position, of an optical slide projector according to the invention showing the projector with its top and intermediate covers raised, with the rear doors open, and with a slide magazine inserted in slide showing position in the projector.

The perspective view of the projector in FIG. 1 together with the bottom view of FIG. 2 illustrate the general arrangement of a slide projector according to the invention. The optical train of the projector includes a projection lamp 10 positioned in a socket 11 and a projecting lens system comprising the lenses 12 of the condenser lens assembly and also the objective lens assembly 13. A projection gate 14 in which a slide is positioned for viewing is located across the optical train between the condenser and the objective lens assemblies. A changer 15 for positioning a plurality of slides in sequence in the projection gate is arranged adjacent the gate. The changer includes a tunnel 16 which is adapted to receive a removable magazine 17 containing a supply of slides arranged in individaul compartments along the length of the magazine and support the magazine in slide showing position adjacent the projection gate. A slide transfer carriage 18, only a very small portion of which is visible in FIGS. 1 and 2, moves the slide from the magazine compartment located at a transfer station opposite the gate into the gate for viewing, and subsequently returns the slide to the same compartment. The magazine is then shifted by a magazine transport mechanism, located beneath the tunnel, to position the next slide in sequence at the transfer station opposite the gate. The action of replacing a slide in the projection gate with the subsequent slide is accomplished automatically by the slide changing mechanism during a "change" cycle upon actuation of the "change" treadle 19. An electric motor 21 drives the slide changing mechanism and also rotates a blower 22 which circulates cooling air throughout the projector. Electrical power for operating the electric motor 21, the projection lamp 10, and an electroluminescent panel lamp 23 is applied at a connector 24.

The various subassemblies of the projector are mounted directly or indirectly on a base member or chassis 25 which extends across the bottom and along the two sides of the projector. Attached to the chassis are a front casting 26 and a rear casting 27. The objective lens assembly 13 is mounted in an opening in the front casting and is movable along the direction of the axis of the optical train in order that the projected image may be properly focused and so that the objective lens assembly may be withdrawn into the casting for storage. An opening for permitting slide magazines to be placed in or withdrawn from the magazine tunnel is also provided in the front casting. The rear casting 27 has an opening through which magazines may be inserted into the tunnel, and the projector operating controls are mounted on the rear casting. The top cover 28 of the projector is hinged to the front casting so that it may be raised as shown in FIG. 1. The top cover may be in either the open or closed position while the projector is operating. However, the cover must be open in order for the slide editing arrangement of the projector to be utilized as will be explained hereinafter. An intermediate cover 29, shown open, is also hinged to the front casting. This cover is ordinarily opened only for maintenance, such as for replacing the projection lamp or cleaning the condenser lenses, and it is closed during operation of the projector in order to obtain proper circulation of cooling air throughout the projector.

Self-storing upper and lower rear doors 30 and 19, shown open in FIG. 1 to provide access to the controls and the magazine tunnel, are closed when the projector is not in use. The doors are mounted on the rear casting in a spring-biased, two-position over-center arrangement so that they will remain in either the closed or the open position. Two similar doors are mounted on the front casting and are open during operation of the projector to permit the transmission of light along the optical train to the viewing screen and to permit the objective lens and the magazine to extend forward beyond the front casting.

Slide changer driving mechanism

Figure 3:
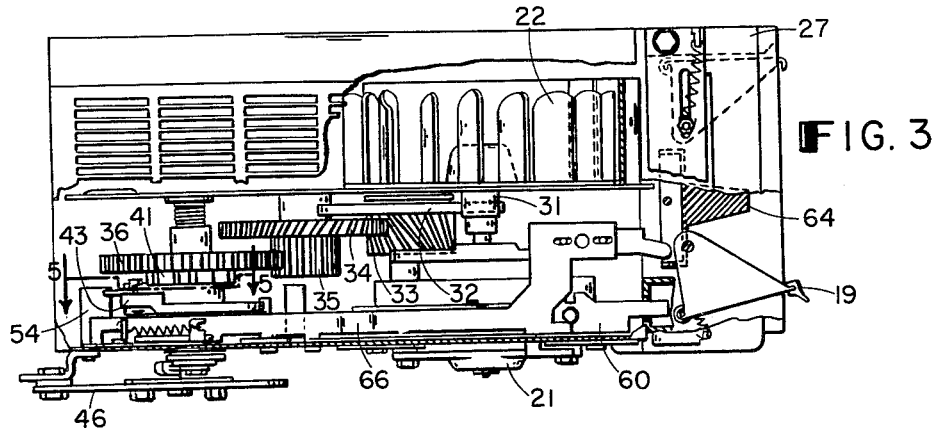
FIG. 3 is a view from the side of the projector illustrating the drive motor, gear train, clutch, and clutch control arrangement for operating the slide changer.
Figure 4:
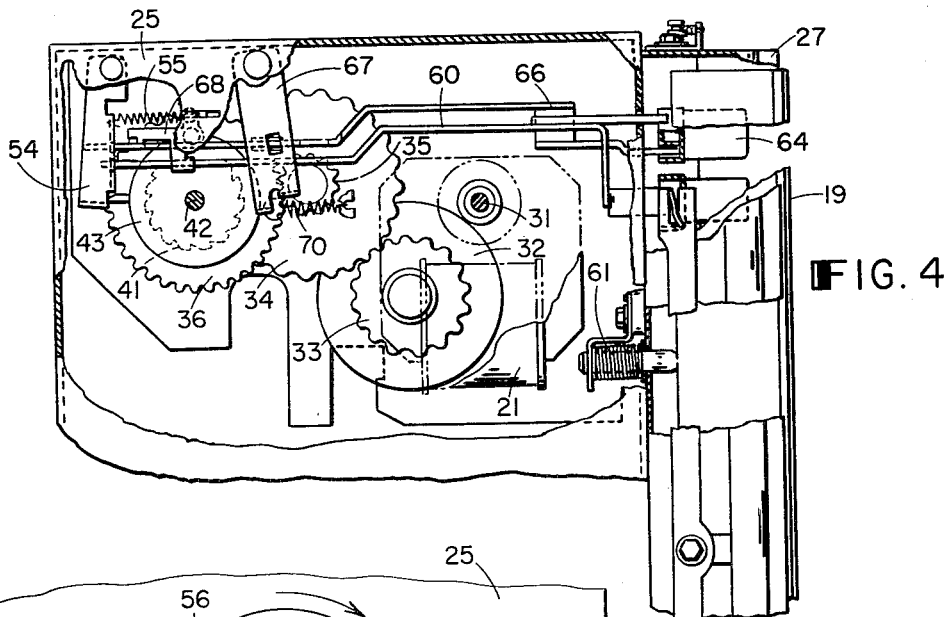
FIG. 4 is a view from the bottom of the projector with portions of the chassis removed in order to show the drive motor, gear train, clutch, and control arrangement.

The slide changing mechanism for moving slides in succession from a magazine to the projection gate and back to the magazine is driven by the electric motor 21 through a gear train, clutch, clutch shaft, and a linkage arrangement which converts the rotary motion of the shaft to reciprocating motion at the slide transfer cariage 18. The gear train and clutch together with the control arrangement for engaging and disengaging the clutch can best be understood by reference to FIGS. 3, 4, and 5.

The shaft of the electric motor 21 is encircled by a rubber sleeve 31 which bears against the side of a metal disc 32 so as to drive the disc. The blower 22 for circulating cooling air is fastened directly to the same shaft. A gear 33 mounted on the disc engages a speed reducing gear 34 which has a pinion 35 meshing with another gear 36. This gear is fastened to a ratchet gear 41 of the clutch and the two gears rotate freely on a clutch shaft 42. A clutch disc 43 is rigidly fastened to the clutch shaft and a crank 44, as shown in FIG. 2, is fastened to the end of the shaft which extends below the chassis. A collapsible connecting link 45 and crossarm 46, which can best be seen in FIG. 2, complete the linkage arrangement to the slide transfer carriage.

Figure 5:
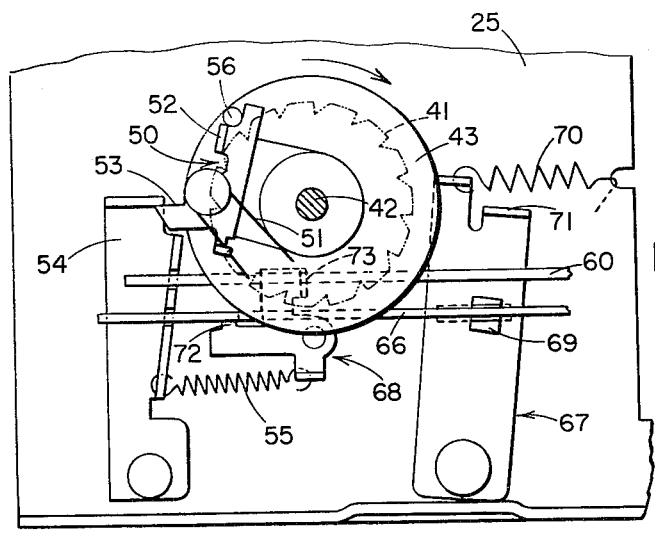
FIG. 5 is a top view of the clutch taken generally along line 5—5 of FIG. 3 and illustrating details of the clutch and the control arrangement associated with it.

The ratchet gear 41 and the clutch disc 43 together with a pawl 50 mounted on the clutch disc provide a clutch which enables the continuously rotating motor to rotate the clutch shaft intermittently, as can be most clearly understood by reference to the detailed view of FIG. 5. An arrangement of stops and control rods permits the operator to selectively to engage the clutch so that it is automatically disengaged after the clutch shaft has rotated through one complete revolution or through one half of a revolution to place the crank in either of two predetermined positions.

The connection between the ratchet gear 41, which is the driving member of the clutch, and the clutch disc 43, which is the driven member, is accomplished through the pawl 50 which is pivotally mounted on the disc. The pawl is biased by an eye-spring 51 in a manner tending to urge an ear 52 of the pawl into the path of the continuously rotating ratchet gear. When the pawl is engaged by the ratchet gear, the clutch disc, clutch shaft and crank rotate with the ratchet gear.

The clutch is disengaged and rotation of the clutch shaft stopped by pivoting the pawl away from the ratchet gear against the action of the eye-spring 51. This pivoting action is accomplished when an arm 53 of the pawl strikes against a stop 54 interposed across the path of rotation of the arm. The rotating motion of the clutch disc and the arm 53 as it strikes the stop causes the pawl to pivot with respect to the disc and releases the ear 52 from the teeth of the ratchet gear. The pawl pivots only until a portion of the pawl contacts a boss 56 on the clutch disc. Although the ratchet gear continues to rotate, the clutch disc is positively stopped in a predetermined position as illustrated in FIG. 5.

The stop is pivotally mounted on the chassis and is normally biased by a spring 55 so as to be in position to intercept the arm of the pawl. Thus, the positions of the clutch disc and the shaft are normally as illustrated in FIG. 5. These positions are the so-called "full cycle" positions of the disc and the shaft, and the stop 54 is the full cycle stop. When the disc and shaft are in the full cycle position the crank 44 is also in the full cycle position which is illustrated in phantom in FIG. 2.

In order that the pawl may engage the ratchet gear to rotate the clutch disc and shaft, the full cycle stop 54 is withdrawn so as to release the arm 53 and permit the eye-spring 51 to pivot the pawl and move the ear 52 into engagement with the rotating ratchet gear. The stop 54 is pivoted to free the pawl by movement of a "change" or "full cycle" control rod 60 in the forward direction toward the front of the projector. The edge of a cutout in the rod engages a portion of the stop so that movement of the rod pushes the stop free of the pawl arm 53.

The "change" control rod 60 is moved forward by depressing the "change" treadle, the lower rear door 19, of the projector beyond its normal open position against the action of a door stop spring 61. The lower inner edge of the door pushes against the control rod and moves it forward. When the treadle is released, the door stop spring 61 returns the treadle to its normal open position. The spring 55 then causes the full cycle stop 54 to return to its normal position in the path of the rotating pawl arm 53 so that the disc and shaft will be stopped in the full cycle position. Thus, momentary actuation of the "change" treadle permits one complete revolution of the clutch disc, shaft, and crank.

When operating the projector, it is also important to be able to rotate the clutch disc and shaft through one-half of a revolution and stop them at a "half cycle" position 180° from the full cycle position shown in FIG. 5. The half cycle position of the crank is illustrated by the fullline showing in FIG. 2. Rotation of the disc from the full to the half cycle position is initiated by depressing a control button 64 mounted on the rear casting 27. The button pivots and pushes a half cycle control rod 66 toward the front of the projector. This rod cooperates with the full cycle stop 54, a half cycle stop 67, and a latch 68 so as to permit the clutch to be engaged and then disengaged when the disc has been rotated to the half cycle position.

The half cycle rod has a protrusion which engages the half cycle stop 67 at an opening 69 in the stop. The stop is pivotally mounted on the chassis and is normally biased clear of the clutch disc and pawl by a spring 70. The half cycle control rod is cut away to provide an edge which bears against a portion of the full cycle stop 67 upon forward movement of the half cycle control rod. When the half cycle control rod is pushed forward against the action of the spring 70 the full cycle stop releases the pawl 50 permitting the clutch disc and shaft to rotate. This movement of the half cycle control rod also moves the half cycle stop into position whereby an arm 71 of the stop intercepts the rotating pawl arm and stops the disc, shaft, and crank in the half cycle position.

Both the half and full cycle stops are held in the positions described above by the action of the latch 68 after the half cycle control rod is released. The latch tends to be pivoted about its mounting on the chassis by the spring 55, but it is normally held in the position shown in FIG. 5 by an ear 72 of the latch which bears against the surface of the half cycle control rod. When the half cycle control rod is moved forward, however, the ear drops into a cutout in the rod. Although the half cycle stop spring 70 tends to move the stop and the rod rearward, the edge of the cutout in the rod abuts the ear of the latch and thus movement of the rod and stop is prevented.

In order to release the clutch disc and shaft from the half cycle position and return them to the full cycle position, the full cycle control rod is moved forward by depressing the change treadle. The edge of a cutout in the full cycle rod strikes a tab 73 on the latch 68 and pivots the latch sufficiently to move the ear 72 out of the cutout in the half cycle rod. The half cycle stop spring 70 then causes the stop 67 and the half cycle rod to return to their normal rearward positions. The clutch pawl 50 is thereby released from the half cycle stop and is pivoted by the eye-spring 51 so that the ear 52 engages the continuously rotating ratchet gear 41 and the clutch is engaged. The full cycle stop 54 also returns to its normal position under the action of the spring 55 after the half cycle rod has been disengaged from the latch and the change treadle is released. The full cycle stop then intercepts the pawl arm and stops the disc, shaft, and crank in the full cycle position.

The linkage arrangement between the intermittently rotating crank 44 and the reciprocating slide transfer carriage 18 of the slide changer is best seen in FIG. 2. The full-line showing in FIG. 2 of the crank and linkage illustrates the positions they assume when the clutch is in the half cycle position. The crank and the end portion of the collapsible connecting link 45 are also shown, in phantom, in the full cycle position.

Pivotally attached to the crank is a rod 74 of the collapsible connecting link 45, details of which are shown in the fragmentary view of FIG. 2A. A slide 75 which is slidable along the length of the rod is normally held in a fixed position with respect to the rod by a detent arrangement. Rollers 76 and 77 which are carried by a spring 78 mounted on the slide are biased toward each other and bear against the edges of the rod. The rollers mate with notches 79 and 80 in the edges of the rod. This detent arrangement normally holds the rod and slide in a fixed relationship as shown in FIGS. 2 and 2A, but any excessive stress between the slide and the rod along the length of the rod forces the rollers out of the notches and the slide and rod slip with respect to each other. Movement of the rod after the stress has been removed permits the rollers to re-enter the notches and re-establish the normal fixed relationship between the rod and slide.

A cross-arm 46 connects the slide of the collapsible connecting link to the slide transfer carriage 18 by pivot connections to the carriage and the slide and a pin and slot connection 81 to the chassis. The linkage arrangement thereby converts the rotary motion of the shaft and crank to reciprocating motion at the slide transfer carriage 18, and the collapsible connecting link 45 isolates the shaft and carriage from each other thus preventing damage in the event of a jam or other stress occurring in the driving mechanism.

*Slide changer and projection gate—general description*

Figure 6:
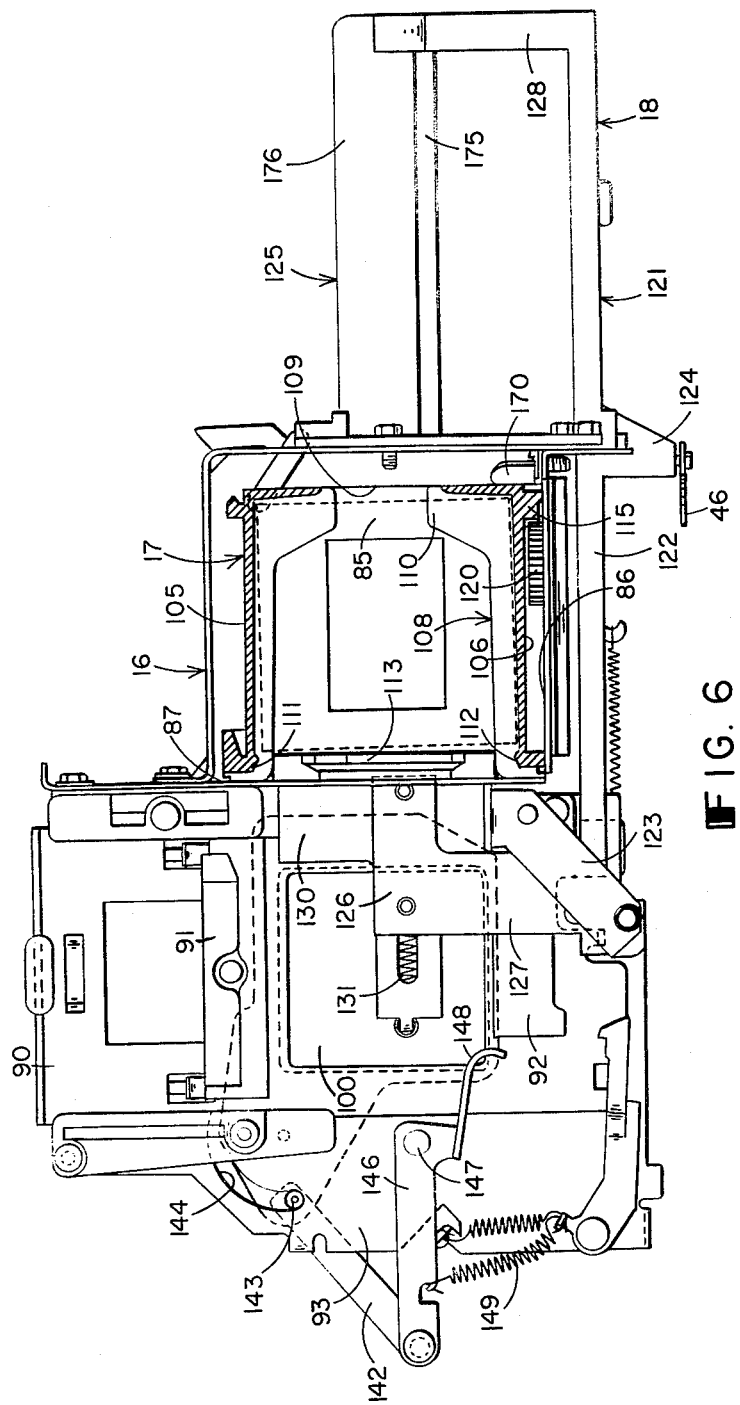
FIG. 6 is a view from the rear illustrating the slide changer and projection gate of the projector and showing a slide magazine in cross section in slide showing position in the changer, the slide transfer carriage of the slide changing mechanism being shown in the slide ejection position with no slide in the projection gate.
Figure 7:
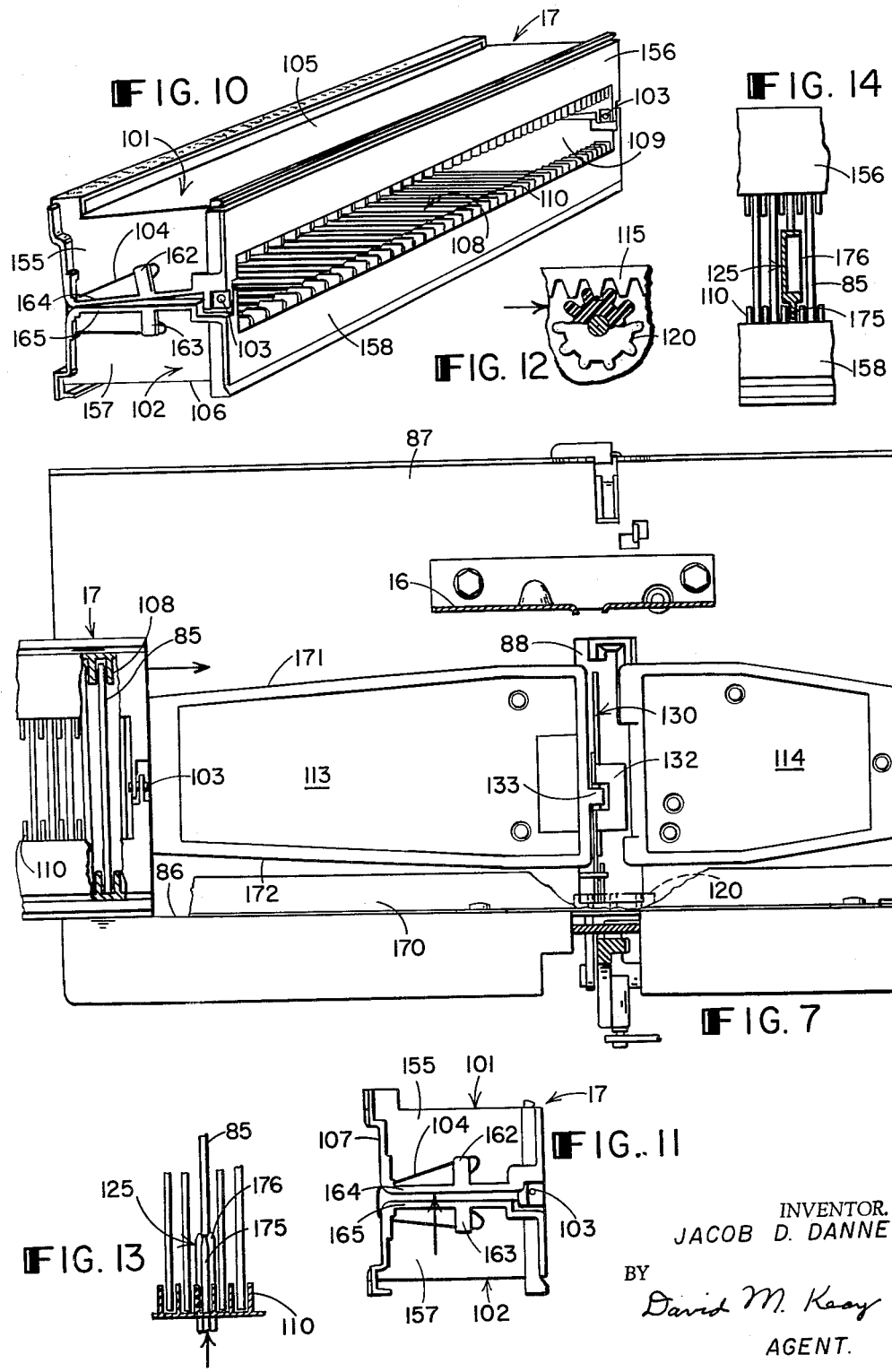
FIG. 7 is a side view of a portion of a slide changer showing a slide magazine being inserted into the changer from the rear while the slide transfer carriage is in the slide ejection position.
Figure 8:
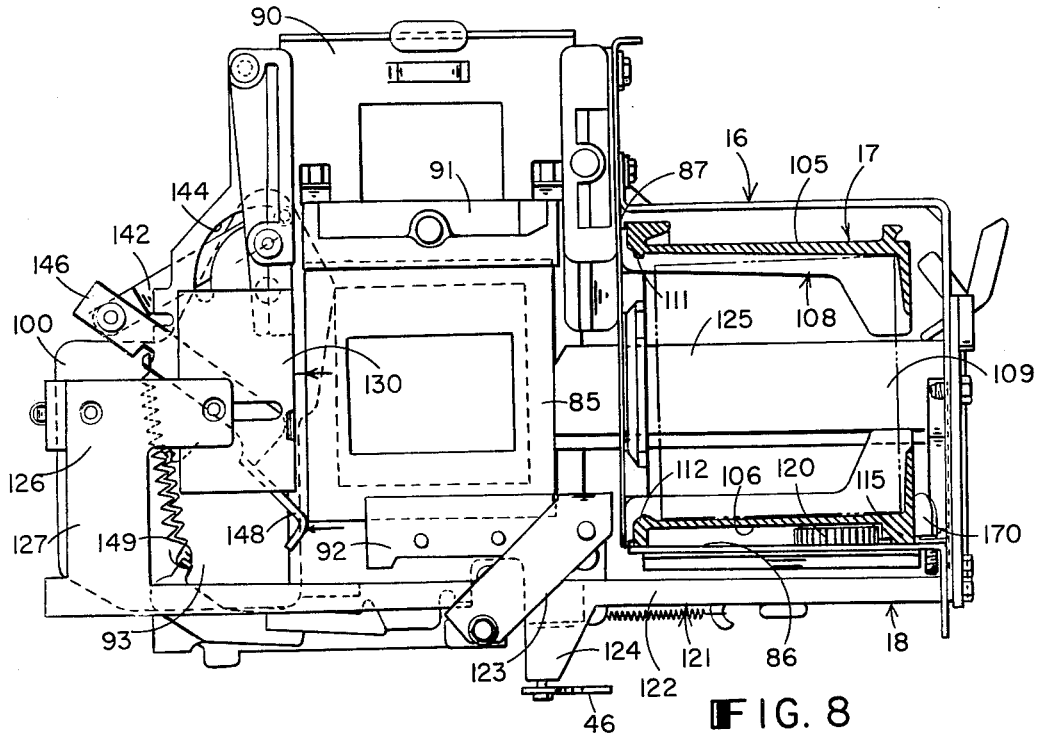
FIG. 8 is a view similar to that of FIG. 6 showing the slide transfer carriage in the slide injection position with a slide in position in the projection gate.

The slide projection gate atnd slide changer are illustrated in FIGS. 6, 7, and 8 with certain portions being shown in greater detail in other figures. The slide changer is driven by the motor through the gear train, clutch, and linkage arrangement successively to place the slides stored in a magazine in the projection gate for viewing. The changer includes a tunnel 16 which is adapted to receive a slide magazine 17 containing a supply of slides 85 to be viewed. The tunnel has a floor 86 which extends the full length of the projector between the openings in the front and rear castings. A side wall 87 which separates the magazine tunnel from the optical train similarly extends the length of the projector. An opening 88 in the side wall opposite the gate, which is best shown in FIG. 7, permits slides to be moved from a magazine in the tunnel to the projection gate and back to the magazine by the slide transfer carriage 18.

The projection gate itself is comprised of an apertured plate 90 having upper and lower slide supports 91 and 92 for holding a slide. The aperture in the gate is aligned with an aperture in a gate support plate 93. The plate is attached to the side wall and both apertures lie above the optical train. The aperture in the support plate is blocked by a shutter 100 in order to prevent the transmission of light along the optical train except when a slide is in projecting position in the gate.

*Slide transfer carriage*

The slide transfer carriage 18 of the changer transfers the slides between the magazine compartments and the projection gate through the opening 88 in the side wall. The entire carriage is reciprocated from the slide ejection position shown in FIG. 6 to the slide injection position shown in FIG. 8 by the slide changer driving mechanism. The linkage arrangement of the driving mechanism places the carriage in the slide ejection position when the clutch and crank are in the half cycle position and places the carriage in the slide injection position when the clutch and crank are in the full cycle position.

The body of the carriage is a yoke 121 having a horizontal bar 122 disposed transversely of the optical train and lying below the tunnel and the aperture of the gate. The bar is slideably mounted for transverse movement in a guide 123 attached to the gate support plate 93. A boss 124 on the bottom of the bar 122 is pivotally connected to the cross-arm 46 of the driving mechanism so that the carriage may be reciprocally driven. An injector arm 125 and an ejector arm 126 extend toward each other from vertical supports 127 and 128 at opposite ends of the bar. The injector arm is adapted to fit into the compartment of a magazine and to push the slide from the compartment, through the opening 88 in the side wall of the tunnel, and into the slide supports 91 and 92 of the gate. The entrances to the supports are appropriately flared to receive a slide and the bottom support 92 contains a springloaded pad. The slide is thus readily pushed into the gate and is positioned firmly for proper projection.

The ejector arm 126 carries an ejector plate 130 which is biased toward the injector arm by a spring 131. When the yoke is moved from the slide injection position of FIG. 8 toward the slide ejection position of FIG. 6, a portion 132 of the ejector plate disposed transversely to the direction of movement of the carriage pushes the slide out of the gate and back into its magazine compartment. As the ejector plate reaches the tunnel side wall, as illustrated in FIG. 7 it strikes a stop 133 and its further movement is prevented while the yoke continues to move. In this position the ejector plate returns the slide to its compartment and the transverse portion lies athwart the opening 88 in the side wall so as to block the opening.

*Shutter*

As a slide is moved from the magazine to the projection gate the last portion of that movement causes the normally closed shutter 100 to open. The shutter is pivotally connected by a pin 140 to the front of the gate support plate 93 as can best be seen in FIG. 9. A point on an arm 141 of the shutter is pivoted at the end of a connecting link 142, and the pivot connection 143 tends to move along an arcuate slot 144 in the gate support plate, the center of the arc being the pivot point 140 of the shutter. A trigger arm 146, as best seen in FIG. 6 is pivoted on the back of the gate support plate at 147. A trigger cam 148 at one end of the trigger arm extends into the region occupied by a slide when the slide is in the projecting position across the optical train. The other end of the trigger arm is pivotally connected to the connecting link 142. A shutter spring 149 biases the trigger arm in a counter-clockwise direction about its pivot point as seen from the rear, FIG. 6. This action tends to hold the pivot connection 143 between the shutter arm and the link 142 at the bottom of the arcuate slot 144, thus holding the shutter in its closed position blocking the path of light from the lamp through the gate.

Figure 9:
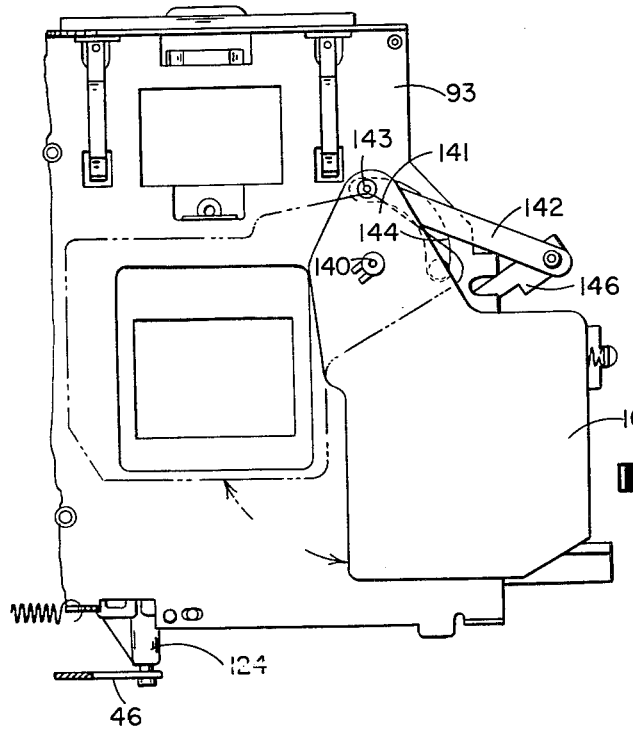
FIG. 9 is a fragmentary view of the slide projection gate from the front.

As can be seen from FIG. 8, when a slide is moved into projecting position in the gate, the slide itself contacts the side surface of the cam 148 of the trigger arm 146. Continued movement of the slide displaces the cam downward and along the direction of movement of the slide thus pivoting the trigger arm in a clockwise direction, as seen in FIG. 8, against the action of the shutter spring 149. Through the connecting link 142 the pivot connection 143 of the link to the shutter is moved to the upper end of the arcuate slot 144 thus pivoting the shutter to its open position as shown in FIG. 9.

When the slide transfer carriage moves from the slide injection position of FIG. 8 toward the slide ejection position of FIG. 6, the ejector plate 130 pushes the slide out of projecting position as explained hereinabove. The first portion of this motion moves the slide clear of the trigger cam and permits the trigger arm to pivot under the action of the shutter spring. The shutter linkage thereby closes the shutter, blocking the transmission of light along the optical train until the next slide is moved into projecting position and displaces the cam.

*Slide magazine*

A slide storage magazine 17 for holding a supply of transparent slides in showing position in the slide projector is illustrated in the perspective view of FIG. 10 and the elevational view of FIG. 11. A portion of the magazine as seen from one side is shown in FIG. 7 and the magazine is also shown in transverse cross section in FIGS. 6 and 8. The magazine is an elongated generally rectangular box comprising two generally similar body members 101 and 102. The upper member 101, as viewed when in position in the tunnel of the slide changer, has a solid top wall 105, partial end walls 155 at opposite ends, and a partial wall 156 at one side. The lower member has a solid bottom wall 106, partial end walls 157, and a partial side wall 158 at one side.

Together the two members provide a slide storage magazine which has an open or front side 107 through which slides may be inserted into and withdrawn from the magazine. The partial side walls 156 and 158 of the two members define a partially open or back side opposite the open side. The back side has an opening 109 along its length in order to provide access to the interior of the magazine for the slide injection arm of the slide transfer carriage. The two partial end walls of each member provide walls at each end of the magazine between the top and bottom walls. At times the magazine may be oriented in other attitudes than that illustrated in the drawings. More particularly, for convenience when placing slides in the magazine it would generally be positioned with the back or partially open side down and the front or open side up.

The upper and lower body members of the magazine are connected together adjacent the back side by means of rivets 103 arranged through the end walls so that the body members pivot with respect to each other. A magazine spring 104 mounted on one end wall of the magazine bears against bosses or lugs 162 and 163 of the upper and lower body members respectively tending to pivot the body members toward each other about the rivets. When there are no slides in the magazine, as illustrated in FIG. 10, the edges 164 and 165 of the partial end walls 155 and 157 contact each other thus limiting the extent of closure of the open side of the magazine. A second magazine spring is similarly mounted on the other end of the body members also tending to bias them toward each other. The springs are each formed in a single open loop and pass through openings in the vertical sections of the edges of the end walls. The configuration of the springs and their mountings serve to limit the extent to which the body members may be pivoted open. FIG. 11 illustrates the magaine with the body members pivoted slightly apart in opposition to the magazine springs.

The interior of the magazine is divided into a longitudinal series of slide compartments by transverse partitions or dividers 108 which are integral with the body members. The partitions extend toward each other from the top and the bottom walls of the magazine but they do not meet. The partitions from each members are spaced apart along the length of the magazine a distance slightly greater than the thickness of a slide, thus the depth of the compartments are such as to hold the slides placed in them upright and separated from each other. At the front side of the magazine the partitions and the top and bottom edges of the end walls extend beyond the major portions of the end walls. Protusions 110 of the partitions at the back side of the magazine for registering the magazine with the slide injection arm of the slide changer extend upward and downward toward each other from the body members into portions of the opening 109 in the back side wall. From the remaining portion of the opening in the back side to the open side of the magazine the interior of the magazine from one end wall to the other end wall is an uninterrupted horizontally extending space.

Longitudinal lips or ridges 111 and 112, as best seen in the cross sectional views of FIGS. 6 and 8, lie along the body members between partitions adjacent the edge of the open side of the magazine. These ridges serve to block the opening of the open side sufficiently to prevent slides from inadvertently dropping from the magazine when the magazine is in its closed position. When the body members are pivoted apart as shown in FIG. 11, the distance between the upper and lower ridges is sufficient to permit the slides to pass through the open side. When a slide is in a compartment of the magazine, it normally lies inside of the retaining ridges 111 and 112 and is engaged at its top and bottom edges adjacent the ridges by the top and bottom walls of the magazine. That is, when the magazine contains slides and is permitted to close, the magazine springs 104 bias the body members against the slides and the edges 164 and 165 of the magazine ends are slightly separated.

Arranged externally along the bottom of the magazine inside of the edge of the back side wall is a rack gear 115 which is illustrated in the fragmentary view of FIG. 12 as seen from below. There is one tooth of the gear at each slide compartment in the magazine. The magazine transport mechanism of the slide changer engages the rack gear in order to advance the magazine after each slide is shown.

*Slide magazine and slide changer*

The slide magazine is placed in slide showing position in the projector by inserting it into the tunnel from the front or rear of the projector while the slide transfer carriage is in the slide ejection position. FIG. 7 illustrates a magazine 17 containing slides 85 being inserted into the tunnel from the rear of the projector. The magazine rests on the floor 86 of the tunnel and the open side is maintained adjacent the side wall 87 of the tunnel by a magazine guide 170, as best shown in FIGS. 6 and 8. Mounted on the side wall are a rearward opening cam 113 rearward of the opening 88 in the side wall and a forward opening cam 114 forward of the opening. These cams open the magazine against the bias of the magazine springs in order to permit each slide to pass through the open side of the magazine when its compartment is in position at the slide transfer station opposite the opening 88 in the tunnel side wall.

The rearward cam has continuous upper and lower surfaces 171 and 172 which are closer together at the rear of the projector than they are in the vicinity of the opening. The cam lies between the outer portions of the partitions of the upper and lower body members as can be seen in FIGS. 6 and 8. Thus, as a magazine is inserted in the tunnel and pushed towards the opening 88 in the side wall, at some point along the cam, portions of the edges of the partitions bear against the upper and lower cam surfaces. Continued movement of the magazine causes the body members to be cammed apart in opposition to the magazine springs 104. Adjacent the opening in the side wall the upper and lower cam surfaces are both horizontal and they are spaced apart so that when a magazine is in slide showing position with a compartment at the slide transfer station the retaining ridges are separated sufficiently to permit the slide to pass through the open side of the magazine.

The forward cam 114 is somewhat similar to the rearward cam except that it does not extend for as great a distance along the side wall of the tunnel. The upper and lower cam surfaces diverge as the opening in the side wall is approached and adjacent the opening they are horizontal.

As the magazine is advanced along the tunnel in order to position successive slide compartments at the slide transfer station, the edges of partitions continue to bear against the horizontal portions of the two magazine opening cams. The magazine is thus held open for each compartment while it is in the slide transfer station opposite the opening 88 in the tunnel side wall.

The cams are slightly tapered in thickness along their lengths so as to extend farther from the side wall as the opening 88 in the side wall is approached. This ramp effect insures that the slides become fully inserted in their compartments adjacent the back side wall of the magazine so as not to jam against the edge of the cam or the slide ejector plate 130.

When the projector is actuated to transfer a slide from the magazine compartment at the slide transfer station into the projection gate, the injector arm 125 moves into the compartment through the opening in the back side and pushes the slide through the enlarged opening of the front side, through the opening 88 in the tunnel side wall, and into the projection gate. As can be seen from the bottom view of a portion of the magazine and injector arm of FIG. 13 and the fragmentary side view of FIG. 14, the injector arm has a narrow lower section 175 and a wide upper section 176. The narrow lower section fits between the protrusions 110 of two adjacent partitions of the lower body member of the magazine thus keying the injector arm to the magazine. The injector arm 125 is thereby positively aligned with the slide compartment at the slide transfer station. The protrusions and the edge of the lower section of the injector arm may be tapered to provide thin edges so as to further insure that the lower section will pass between the partitions and not jam against one of them.

The upper section of the injector arm 176 is slightly wider than the depth of a single slide compartment. Since the protrusions of the partitions extend only a partial distance into the opening 109 in the back side wall, the upper section can pass completely through the opening and the uninterrupted space within the interior of the magazines without interference from the partitions defining the compartments. The width of the upper section is such that the registration action of the lower section prevents the arm from reaching into adjacent compartments and contacting other slides. Since the upper section of the arm spans the entire depth of the slide compartment it is assured that the edge of the injector arm will contact the slide in the compartment. The arm cannot pass along the face of the slide damaging it or jamming the projector. The contour of the slide contacting edge of the injector arm is illustrated in FIG. 13. The edge is grooved vertically in order to accept the edge of the slide as shown. The outer portions of the edge are beveled so that the arm will tend to slide by any slides in adjacent compartments which might be warped sufficiently to extend beyond their own compartments.

After a slide has been transferred into the projection gate by the injector arm and shown by the projector, it is returned to the magazine by the action of the ejector arm and plate as described hereinabove. The slide magazine is then advanced toward the front of the projector a distance equal to the depth of one slide compartment by the magazine transport mechanism in order to place the next slide compartment in sequence at the slide transfer station for movement of the slide into the gate. As illustrated in FIG. 12 the rack gear 115 along the bottom of the magazine is engaged by the gear teeth of an indexing drive wheel 120 of the magazine transport mechanism. The drive wheel protrudes above the floor 86 of the tunnel, as illustrated in phantom in FIG. 7 and as shown in FIGS. 6 and 8, to mesh with the rack gear on the magazine. The indexing drive wheel is rotated through an angle equal to the angle between its gear teeth to cause the magazine to move longitudinally the depth of one compartment.

The magazine transport mechanism is actuated to rotate the indexing wheel by the final movement of the slide transfer carriage into the slide ejection position. Movement of the magazine does not occur until after the ejector plate 130 has pushed the slide from the gate and completely returned it to its compartment, and the injector arm has moved clear of the magazine. The return movement of the slide transfer carriage to the slide injection position then moves the slide newly arrived at the transfer station from its compartment and carries it into the projection gate.

More complete details concerning the magazine transport mechanism may be had by reference to application, Serial No. 150,296 now, U.S. Patent No. 3,173,331, entitled "Transparent Slide Projector" filed November 16, 1961, by Jacob D. Danner and assigned to the assignee of the present invention.

What is claimed is:

1. A magazine for storing a plurality of transparent slides for removal one at a time to a projection gate in a slide projector including a first member having a top wall, a pair of partial end walls at the ends of the top wall, and a portion of a side wall; a second member having a bottom wall, a pair of partial end walls at the ends of the bottom wall, and a portion of the side wall; connecting means pivotally connecting the two members together at the partial end wall portions so as to provide between said side walls a slide injector receiving length and an open side opposite the side wall; a plurality of partitions extending toward each other from said first and second members for dividing the magazine into a plurality of slide compartments; and biasing means for biasing the first and second members about said connecting means in a direction tending to close the open side to prevent withdrawal of the slides therefrom.

2. A magazine for storing a plurality of transparent slides for removal one at a time to a projection gate in a slide projector including a first member having a first solid wall, a portion of a first end wall, a portion of a second end wall, and a portion of a side wall; a second member having a second solid wall, a portion of the first end wall, and a portion of the second end wall at least one of said solid walls having inwardly projecting slide compartment forming partitions; connecting means pivotally connecting the two portions of the first end wall together and the two portions of the second end wall together in confronting relation wherein said first and second members provide a generally rectangular elongated structure with the confronting surfaces of both of said first and second members and said partitions together defining slide compartments, and with a side wall having a slide injector receiving opening along its length and an open slide feeding side opposite the side wall having said slide injector receiving opening; and biasing means for biasing the first and second members about said connecting means in a direction tending to close the open side and sandwich the slides between said solid walls.

3. A magazine for storing a plurality of transparent slides for removal one at a time to a projection gate in a slide projector including a first member having a first solid wall, a portion of a first end wall, a portion of a second end wall, and a portion of a side wall; a second member having a second solid wall at least one of said solid walls having inwardly projecting slide compartment forming partitions; connecting means for pivotally connecting the first member and the second member in confronting relation so as to provide a generally rectangular elongated structure with the confronting surfaces of both of said first and second members and said partitions together defining slide compartments, and with a side having an opening along its length and an open side opposite said side; and biasing means tending to pivot the first and second members about said connecting means in a direction tending to close the open side to prevent withdrawal of the slides therefrom.

4. An elongated generally rectangular magazine for storing a supply of transparent slides for removal one at a time to a projection gate in a slide projector including a first member having a solid top wall, a portion of a first end wall, a portion of a second end wall, and a portion of a side wall; a second member having a solid bottom wall, a portion of the first end wall, a portion of the second end wall, and a portion of the side wall at least one of said solid walls having inwardly projecting slide compartment forming partitions; connecting means pivotally connecting the two portions of the first end wall together and the two portions of the second end wall together wherein said first and second members provide a generally rectangular elongated structure with the confronting surfaces of both of said first and second members and said partitions together defining slide compartments, and with a side wall having an opening along its length and an open side opposite the side wall; and resilient means for biasing the first and second members about said connecting means in a direction tending to close the open side to prevent withdrawal of the slides therefrom.

5. An elongated generally rectangular magazine for storing a supply of transparent slides for removal one at a time to a projection gate in a slide projector including a first member having a solid top wall, a portion of a first end wall, a portion of a second end wall, and a portion of a side wall; a second member having a solid bottom wall, a portion of the first end wall, a portion of the second end wall, and a portion of the side wall; connecting means pivotally connecting the two portions of the first end wall together adjacent the side wall and the two portions of the second end wall together adjacent the side wall so that said first and second members provide a generally rectangular elongated structure with the side wall having an opening along its length and an open side opposite the side wall; a plurality of transverse partitions extending from the top wall toward the bottom wall, and a similar plurality of transverse partitions extending from the bottom wall toward the partitions extending from the top wall dividing the interior of the magazine into a longitudinal series of slide compartments; longitudinal slide retaining ridges along the top and bottom walls adjacent the open side and extending toward each other; first and second springs mounted on the first and second end walls respectively for biasing the first and second members together about said connecting means so as to tend to close the open side; and means on said first and second members adapted to be moved apart so as to pivot said first and second members about said connecting means in opposition to said springs and further open the open side.

6. An elongated generally rectangular magazine for storing a supply of transparent slides for removal one at a time to a projection gate in a slide projector by a slide transfer member of the projector including a first member having a solid top wall, a portion of a first end wall, a portion of a second end wall, and a portion of a side wall; a second member having a solid bottom wall, a portion of the first end wall, a portion of the second end wall, and a portion of the side wall; connecting means pivotally connecting the two portions of the first end wall together and the two portions of the second end wall together so that said first and second members provide a generally rectangular elongated structure with the side wall having an opening along its length and an open side opposite the side wall; a plurality of transverse partitions extending from the top wall toward the bottom wall and spaced apart longitudinally intermediate the end walls, and a similar plurality of transverse partitions extending from the bottom wall toward the partitions extending from the top wall, thereby dividing the interior of the magazine into a longitudinal series of slide compartments; protrusions on said partitions extending into a portion of the opening in the side wall; the protrusions, the portions of the side wall, the end walls, and the partitions defining an uninterrupted open space from the remainder of the opening in the side wall exclusive of the portion into which the protrusions extend through the magazine to the open side and from one end wall to the other end wall, whereby the protrusions extending into the opening provide guides to receive a section of the slide transfer member therebetween for aligning the slide transfer member with a compartment as the member is moved transversely through the magazine from the opening in the side wall to the open side, said uninterrupted open space providing passage transversely through the magazine from the opening in the side wall to the open side for another section of the slide transfer member of width greater than the spacing between adjacent partitions; and resilient means for biasing the first and second members about said connecting means in a direction tending to close the open side.

7. An elongated generally rectangular magazine for storing a supply of transparent slides for removal one at a time to a projection gate in a slide projector by a slide transfer member of the projector including a first member having a solid top wall, a portion of a first end wall, a portion of a second end wall, and a portion of a side wall; a second member having a solid bottom wall, a portion of the first end wall, a portion of the second end wall, and a portion of the side wall; connecting means pivotally connecting the two portions of the first end wall together adjacent the side wall and the two portions of the second end wall together adjacent the side wall so that said first and second members provide a generally rectangular elongated structure with the side wall having an opening along its length and an open side opposite the side wall; a plurality of transverse partitions extending from the top wall toward the bottom wall and spaced apart longitudinally intermediate the end walls, and a similar plurality of transverse partitions extending from the bottom wall toward the partitions extending from the top wall, thereby dividing the interior of the magazine into a longitudinal series of slide compartments; said partitions spanning only a portion of the distance between the top and bottom walls so as to provide an uninterrupted horizontally extending space within the magazine from a first portion of the opening in the side wall to the open side and from one end wall to the other end wall; protrusions on said partitions extending vertically into a second portion of the opening in the side wall, whereby adjacent protrusions extending into the second portion of the opening provide guides to receive a section of the slide transfer member therebetween for aligning the slide transfer member with a compartment as the member is moved transversely through the magazine from the opening in the side wall to the open side, said uninterrupted horizontally extending space providing passage transversely through the magazine from the opening in the side wall to the open side for another section of the slide transfer member of width greater than the spacing between adjacent partitions; first and second springs mounted on the first and second end walls, respectively, for biasing the first and second members together about said connecting means so as to tend to close the open side; and means on said first and second members adapted to be moved apart so as to pivot said first and second members about said connecting means in opposition to said springs and further open the open side.

8. In a slide projector for use with a slide storage magazine of a generally elongated rectangular shape comprising upper and lower body members pivotally connected adjacent one side, a side wall at said side having an opening therethrough, an open side opposite said side through which slides may be inserted into and withdrawn from the magazine, a plurality of partitions dividing the interior of the magazine into slide compartments, said partitions spanning only a portion of the distance between the upper and lower body members so as to provide an uninterrupted horizontally extending space within the magazine from a first portion of the opening in the side wall to the open side, protrusions on said partitions extending vertically into a second portion of the opening in the side wall, and biasing means tending to pivot the body members toward each other so as to prevent the movement of slides through the opening of the open side; the combination including an optical train for projecting an image of a transparent slide; a gate across said train for supporting a slide therein; a magazine support for supporting a slide magazine in slide showing position adjacent the gate; a slide transfer carriage for moving a slide from a magazine in slide showing position on said support to the gate and for returning the slide from the gate to the magazine; magazine opening means mounted on said support and adapted to be contacted by the two body members of the magazine at the open side of the magazine so as to cam the members apart about the pivotal connections as the magazine is inserted into slide showing position on said support whereby the opening of the open side is enlarged to permit the slide transfer carriage to move a slide therethrough; a slide injecting arm on said slide transfer carriage adapted to pass through the opening in the side wall of the magazine for pushing a slide from a compartment of the magazine through the open side of the magazine and into the gate; a first section of said slide injecting arm being of width less than the spacing between protrusions of adjacent partitions and adapted to pass through the second portion of the opening in the side wall between the protrusions of two adjacent partitions so as to guide the slide injecting arm into a slide compartment; and a second section of said slide injecting arm for contacting a slide being of width greater than the spacing between adjacent partitions and less than the spacing between adjacent partitions plus the thickness of two partitions, whereby the second section is adapted to pass through the first portion of the opening in the side wall and through the uninterrupted horizontally extending space within the magazine.

9. In a slide projector for use with a slide storage magazine of a generally elongated rectangular shape comprising upper and lower body members pivotally connected adjacent one side, a side wall at said side having an opening therethrough, an open side opposite said side through which slides may be inserted into and withdrawn from the magazine, a plurality of partitions dividing the interior of the magazine into slide compartments, said partitions spanning only a portion of the distance between the upper and lower body members so as to provide an uninterrupted horizontally extending space within the magazine from a first portion of the opening in the side wall to the open side, protrusions on said partitions extending vertically into a second portion of the opening in the side wall, and biasing means tending to pivot the body members toward each other so as to prevent the movement of slides through the opening of the open side; the combination including an optical train for projecting an image of a transparent slide; a gate across said train for supporting a slide therein; a magazine support for supporting a slide magazine in slide showing position at the projector; a slide transfer carriage for moving a slide from a magazine in slide showing position on said support to the gate and for returning the slide from the gate to the magazine; actuating means for alternately driving the slide transfer carriage transversely from a slide injection position to place a slide in the gate to a slide ejection position to return the slide to the magazine; a magazine opening cam mounted on said support and adapted to lie intermediate the upper and lower body members of the magazine at the open side of the magazine when the magazine is in slide showing position on said support; an upper cam surface on said cam for engaging the upper body member of the magazine; a lower cam surface on said cam for engaging the lower body member of the magazine; said cam surfaces diverging from each other so that as the magazine is inserted into slide showing position on the support the cam surfaces engage the body members at the open side of the magazine and pivot the body members apart in opposition to the biasing means whereby the opening of the open side of the magazine is increased so as to permit the slide transfer carriage to move slides therethrough; a slide injecting arm on said slide transfer carriage adapted to pass through the opening in the side wall of the magazine as the slide transfer carriage is driven from the slide ejection position to the slide injection position and push a slide from a compartment of the magazine through the open side of the magazine and into the gate; a first section of said slide injecting arm being of width less than the spacing between protrusions of adjacent partitions and adapted to pass through the second portion of the opening in the side wall between the protrusions of two adjacent partitions so as to guide the slide injecting arm into a slide compartment as the slide transfer carriage is driven from the slide ejection position to the slide injection position; and a second section of said slide injecting arm for contacting a slide being of width greater than the spacing between adjacent partitions and less than the spacing between adjacent partitions plus the thickness of two partitions, whereby the second section is adapted to pass through the first portion of the opening in the side wall and through the uninterrupted horizontally extending space within the magazine as the slide transfer carriage is driven from the slide ejection position to the slide injection position.

10. Slide projecting apparatus for supporting a supply of transparent slides and transferring them to and from projecting position including in combination a gate for supporting a slide in projecting position across an optical train; an elongated generally rectangular magazine having a solid top wall, a solid bottom wall opposite said top wall, transverse end walls between said top and bottom walls, an open side through which slides may be introduced in and withdrawn from the magazine, a side wall opposite said open side, and an opening in the side wall along the length of the opposite side between said end walls; a plurality of transverse partitions spaced apart longitudinally intermediate the end walls dividing the magazine into a series of slide storage compartments; protrusions on said partitions extending into a portion of the opening in the side wall; the protrusions, the side wall, the end walls, and the partitions defining an uninterrupted open space from the remainder of the opening in the side wall exclusive of the portion into which the protrusions extend through the magazine to the open side and from one end wall to the other end wall; a magazine support for supporting the magazine in slide showing position adjacent the gate; slide transfer means for moving a slide from the magazine to the gate and for returning the slide from the gate to the magazine; a slide injecting member of said slide transfer means adapted to push a slide from a compartment of the magazine through the open side of the magazine and into the gate; a first section of said slide injecting member being adapted to pass through the portion of the opening in the side wall between the protrusions of two adjacent partitions so as to guide the slide injecting member into a slide compartment; and a second section of said slide injecting member being of width greater than the spacing between adjacent partitions and adapted to pass through the remainder of the opening in the side wall and through the uninterrupted open space within the magazine for contacting the slide in the compartment.

11. Slide projecting apparatus for supporting a supply of transparent slides and transferring them to and from projecting position including in combination a gate for supporting a slide in projecting position across an optical train; an elongated generally rectangular magazine having a solid top wall, a solid bottom wall opposite said top wall, transverse end walls between said top and bottom walls, an open side through which slides may be introduced in and withdrawn from the magazine, a slide wall opposite said open side, and an opening in the side wall along the length of the opposite side between said end walls; a plurality of transverse partitions spaced apart longitudinally intermediate the end walls dividing the magazine into a series of slide storage compartments; said partitions spanning only a portion of the distance between the top and bottom walls so as to provide an uninterrupted horizontally extending space within the magazine from a first portion of the opening in the side wall to the open side and from one end wall to the other end wall; protrusions on said partitions extending vertically into a second portion of the opening in the side wall; a magazine support for supporting the magazine in slide showing position adjacent the gate; a slide transfer carriage for moving a slide from the magazine to the gate and for returning the slide from the gate to the magazine; actuating means for alternately driving the slide transfer carriage transversely from a slide injection position to place a slide in the gate to a slide ejection position to return the slide to the magazine; a slide injecting arm on said slide transfer carriage adapted to pass through the opening in the side wall of the magazine as the slide transfer means is driven from the slide ejection position to the slide injection position and push a slide from a compartment of the magazine through the open side of the magazine and into the gate; a first second of said slide injecting arm being of width less than the spacing between protrusions of adjacent partitions and adapted to pass through the second portion of the opening in the side wall between the protrusions of two adjacent partitions so as to guide the slide injecting arm into a slide compartment as the slide transfer carriage is driven from the slide ejection position to the slide injection position; and a second section of said slide injecting arm for contacting a slide being of width greater than the spacing between adjacent partitions and less than the spacing between adjacent partitions plus the thickness of two partitions, whereby the second section is adapted to pass through the first portion of the opening in the side wall and through the uninterrupted horizontally extending space within the magazine as the slide transfer carriage is drven in the slide ejection position to the slide injection position.

12. In a slide projecting apparatus for supporting a supply of transparent slides and transferring them to and from projecting position including in combination a gate for supporting a slide in projecting position across an optical train; a first member of a slide storage magazine having a first solid wall, a portion of a first end wall, a portion of a second end wall, and a portion of a side wall; a second member of the slide storage magazine having a second solid wall at least one of said solid walls having inwardly projecting slide compartment forming partitions; connecting means for pivotally mounting the first member and the second member in confronting relation so as to provide a generally rectangular elongated structure with the confronting surfaces of both of said first and second members and said partitions together defining slide compartments, and with a side wall having an opening along its length and an open slide feeding side opposite the side wall having said opening; biasing means tending to pivot the first and second members about said connecting means in a direction tending to close the opening of the open side to prevent withdrawal of the slides therefrom; a magazine support for supporting the magazine in slide showing position adjacent the gate; a slide transfer means for moving a slide from the magazine to the gate and for returning the slide from the gate to the magazine; and magazine opening means mounted on said support and adapted to be contacted by the two body members of the magazine at the open side of the magazine so as to cam the members apart about said connecting means as the magazine is inserted into slide showing position on said support whereby the opening of the open side is enlarged to permit the slide transfer means to move a slide therethrough.

13. In a slide projecting apparatus for supporting a supply of transparent slides and transferring them to and from projecting position including in combination a gate for supporting a slide in projecting position across an optical train; an upper body member of a slide storage magazine having a solid top wall, a portion of a first end wall, a portion of a second end wall, and a portion of a side wall; a lower body member of the slide storage magazine having a solid bottom wall, a portion of the first end wall, a portion of the second end wall, and a portion of the side wall; at least one of said solid walls having inwardly projecting slide compartment forming partitions; connecting means pivotally connecting the two portions of the first end wall together and the two portions of the second end wall together wherein said first and second members provide a generally rectangular elongated structure with the confronting surfaces of both of said upper and lower body members and said partitions defining together slide receiving compartments, and with a side wall having an opening along its length and an open side opposite the side wall; resilient means mounted on said upper and lower body members for biasing the members about said connecting means in a direction tending to close the opening of the open side to prevent withdrawal of the slides therefrom; a magazine support for supporting the magazine in slide showing position adjacent the gate; slide transfer means for moving a slide from the magazine to the gate and for returning the slide from the gate to the magazine; a magazine opening cam mounted on said support and adapted to lie intermediate the upper and lower body members of the magazine at the open side of the magazine when the magazine is in slide showing position on said support; an upper cam surface on said cam for engaging the upper body member of the magazine; and a lower cam surface on said cam for engaging the lower body member of the magazine; said cam surfaces diverging from each other so that as the magazine is inserted into slide showing position on the support the cam surfaces engage the body members at the open side of the magazine and pivot the body members apart in opposition to said resilient means whereby the opening of the open side of the magazine is increased so as to permit the slide transfer member to move slides therethrough.

14. In combination with a slide storage magazine of a generally elongated rectangular shape comprising upper and lower body members pivotally connected adjacent one side, a side wall at said side having an opening therethrough, an open side opposite said side through which slides may be inserted into and withdrawn from the magazine, a plurality of partitions dividing the interior of the magazine into slide compartments, and biasing means tending to pivot the body members toward each other wherein the slide compartments are reduced to a minimum size which confines the slides therein, so as to prevent the movement of slides through the opening of the open side; a projector for receiving said magazine and for removing slides therefrom for projection and then returning them thereto; said projector including a magazine support for supporting said slide magazine in slide showing position; and magazine opening means mounted on said support for urging the two body members of the magazine apart at the open side of the magazine against the force of the biasing means as the magazine is inserted into slide showing position on said support whereby the opening of the open side is enlarged to permit the slides readily to be removed from the magazine.

15. The combination of claim 14 wherein said magazine opening means includes a magazine opening cam mounted on said support and adapted to lie intermediate the upper and lower body members of the magazine at the open side of the magazine when the magazine is in slide showing position on said supoprt; an upper cam surface on said cam for engaging the upper body member of the magazine; and a lower cam surface on said cam for engaging the lower body member of the magazine; said cam surfaces diverging from each other so that as the magazine is inserted into slide showing position on the support the cam surfaces engage the body members at the open side of the magazine and pivot the body members apart in opposition to the biasing means whereby the opening of the open side of the magazine is increased so as to permit the slide transfer carriage to move slides therethrough.

16. In a slide projector having a support for a horizontally disposed, straight, elongated, partitioned slide magazine, and a horizontally reciprocating slide transfer member for extracting in sequence from the magazine slides positioned therein in slide containing compartments and delivering the same to a projection station, a horizontally disposed, straight, elongated, partitioned slide magazine on said magazine support, said magazine including a first wall defining the top of the magazine, a second wall opposite the first wall defining the bottom of the magazine and wall means interconnecting said first and second walls, said magazine having a horizontally facing injector member receiving opening along the length of said magazine between said first and second walls, said magazine having on the side thereof opposite the one having said injector member receiving opening a horizontally facing open side through which slides may be inserted in and removed from the magazine, said magazine having vertical partitions which extend only partway vertically across the magazine to leave an unobstructed space extending completely horizontally across the magazine, said partitions dividing the magazine into a series of identical longitudinally spaced compartments for receiving said slides, said magazine having guide forming protrusions along said slide injector receiving opening which protrusions are generally in the planes of said vertical partitions and also extending only partway across the magazine to leave said opening unobstructed in regions horizontally aligned with said unobstructed space in said magazine, said slide transfer member having a first relatively narrow section which slidably engages an adjacent pair of said guide forming protrusions during the reciprocation thereof which protrusions guide the movement thereof, and a second section which has a width wider than the distance between the confronting inner surfaces of the adjacent portrusions but not greater than the distance between the outermost surfaces of the latter and which extends into said unobstructed space during the reciprocation of the slide transfer member to engage the slide in the compartment located between said protrusions and remove the same from the magazine compartment.

17. The combination of claim 16 wherein the end of said slide transfer member which engages the slide having a vertical groove therein that receives and accurately positions the slide in a given vertical plane in the movement thereof to said projection station.

References Cited by the Examiner
UNITED STATES PATENTS

| | | | |
|---|---|---|---|
| 2,711,602 | 6/1953 | Wiklund | 40—79 |
| 2,938,288 | 5/1960 | Wallin | 40—79 |
| 2,942,365 | 6/1960 | Badalich | 40—79 |
| 2,953,967 | 9/1960 | Aronson et al. | 88—28 |
| 2,982,177 | 5/1961 | Briskin et al. | 88—28 |
| 2,986,070 | 5/1961 | Lacoe | 88—28 |
| 3,146,666 | 9/1964 | Misuraca | 40—79 X |

EUGENE R. CAPOZIO, *Primary Examiner.*

E. GORDON ANDERSON, JEROME SCHNALL, *Examiners.*